US008528156B2

(12) United States Patent
Umeno

(10) Patent No.: US 8,528,156 B2
(45) Date of Patent: Sep. 10, 2013

(54) WIPER BLADE

(75) Inventor: Takashi Umeno, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 222 days.

(21) Appl. No.: 13/101,335

(22) Filed: May 5, 2011

(65) Prior Publication Data

US 2011/0277266 A1  Nov. 17, 2011

(30) Foreign Application Priority Data

May 12, 2010 (JP) ................................. 2010-110250

(51) Int. Cl.
*B60S 1/40* (2006.01)

(52) U.S. Cl.
USPC ................................... 15/250.44; 15/250.361

(58) Field of Classification Search
USPC  15/250.43, 250.361, 250.201, 250.451–250.47, 15/250.44
See application file for complete search history.

(56) References Cited

U.S. PATENT DOCUMENTS

| 3,097,389 A * | 7/1963 | Contant et al. ............. 15/250.48 |
| 3,116,509 A * | 1/1964 | Contant et al. ............. 15/250.48 |

FOREIGN PATENT DOCUMENTS

| EP | 1816041 A1 * | 8/2007 |
| JP | 2006-36130 A | 2/2006 |
| JP | 2008-132884 A | 6/2008 |
| JP | 2008230340 A * | 10/2008 |
| WO | WO 2010035794 A1 * | 4/2010 |

OTHER PUBLICATIONS

WO2010035794A1 (machine translation).*
JP2008230340A (machine translation).*
JP2008230340A (machine translation), 2008.*
WO20100357094A1 (machine translation), 2009.*

* cited by examiner

*Primary Examiner* — Mark Spisich
*Assistant Examiner* — Andrew A Horton
(74) *Attorney, Agent, or Firm* — Marsh Fischmann & Breyfogle LLP

(57) ABSTRACT

A wiper blade for connection to a wiper arm for wiping a surface to be wiped while swinging to-and-fro between a wiper stop position and a reversal position. The wiper blade includes a lever member configured to be coupled to the wiper arm, and a blade rubber retained by the lever member. The lever member includes first and second retaining hooks projecting toward the surface to be wiped and arranged at an interval in the longitudinal direction of the lever member. The blade rubber includes accommodating grooves, which are open toward a wiping direction. A leaf spring member is mounted in each accommodating groove. The first and second retaining hooks retain the blade rubber while preventing the leaf spring members from falling out of the accommodating grooves. The lever member further includes fall-off preventing protrusions arranged between the first and second retaining hooks in the longitudinal direction of the lever member. The fall-off preventing protrusions project toward the surface to be wiped. The fall-off preventing protrusions are arranged on the rear side of the blade rubber with respect to a direction in which the blade rubber moves from the wiper stop position toward the reversal position. The fall-off preventing protrusions permit movement of the blade rubber in the direction perpendicular to the surface. When the blade rubber moves from the wiper stop position toward the reversal position, the fall-off preventing protrusions receive the blade rubber so as to prevent the leaf spring members from falling out of the accommodating grooves.

14 Claims, 3 Drawing Sheets

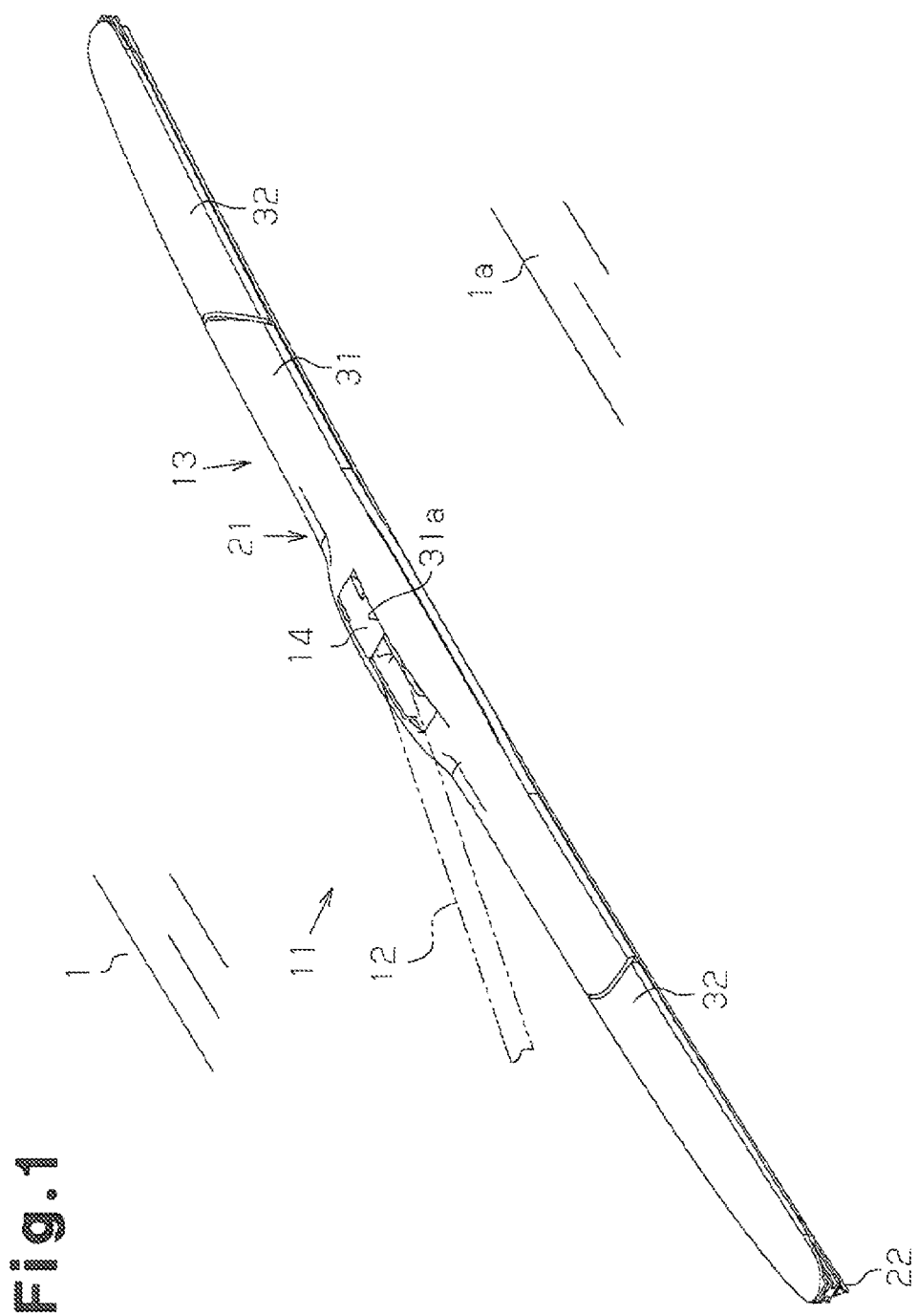

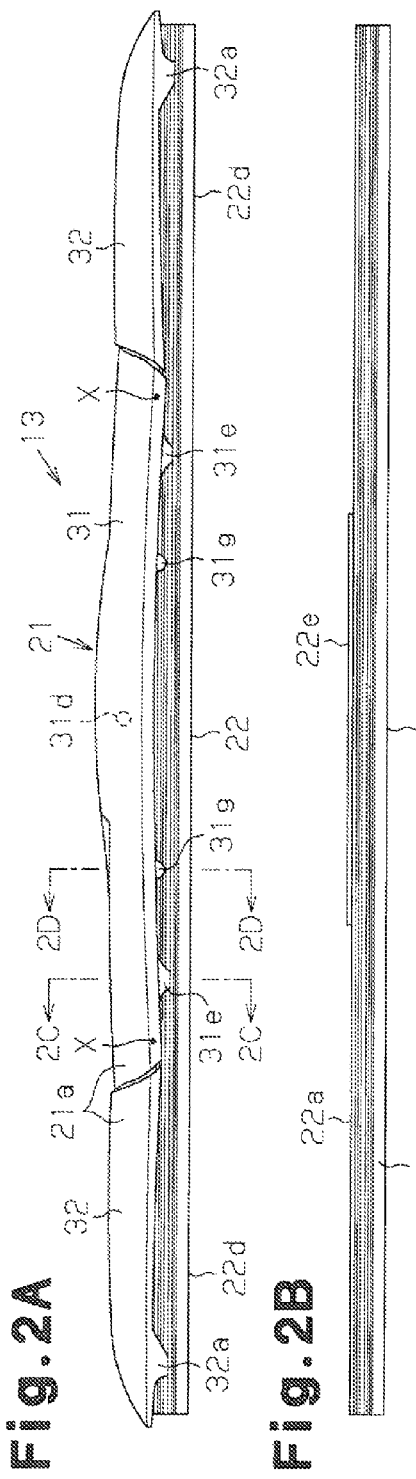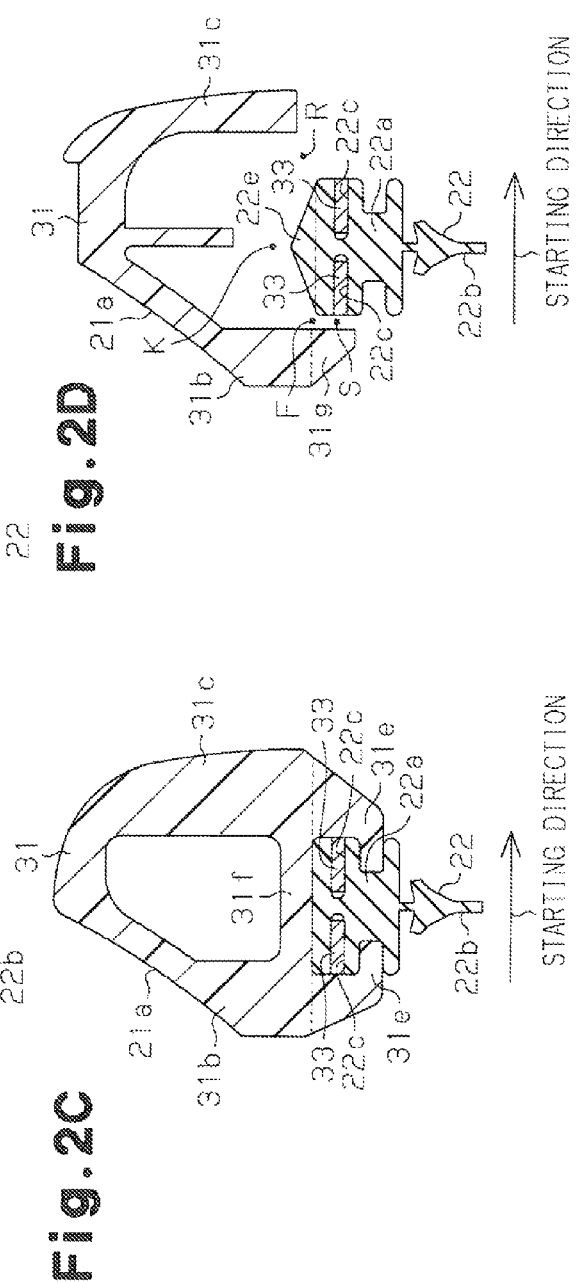

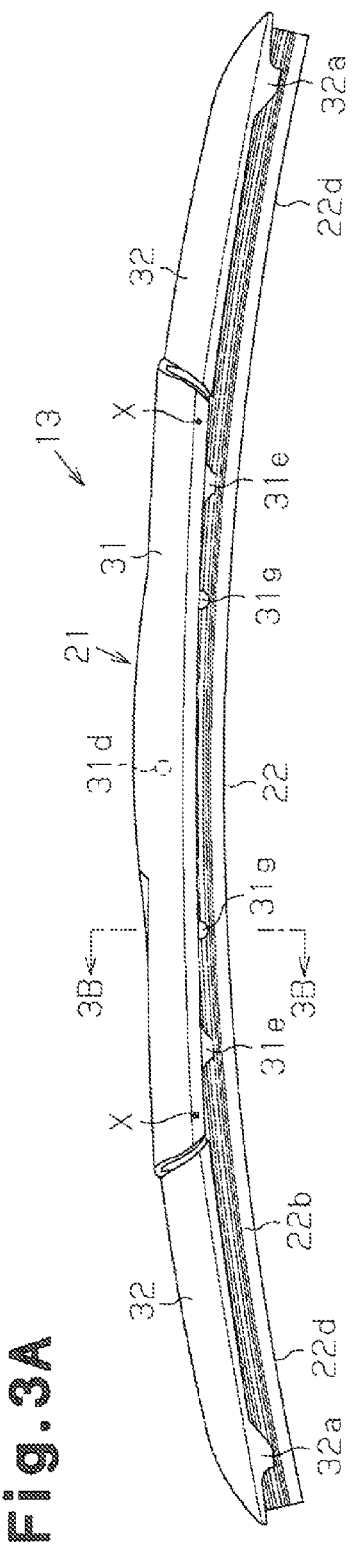
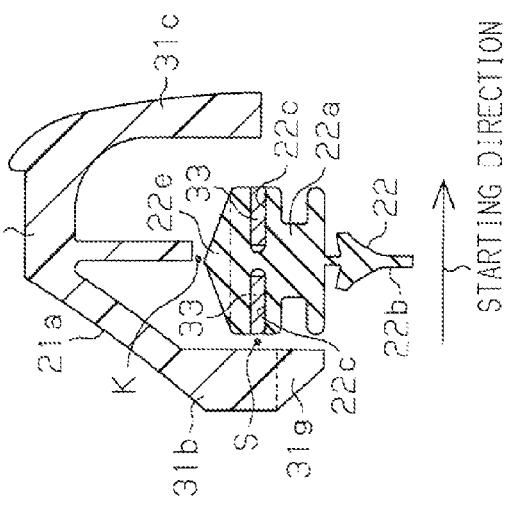

WIPER BLADE

BACKGROUND OF THE INVENTION

The present invention relates to a wiper blade that is suitable for wiping, for example, a windshield surface of an automobile.

A wiper blade of a wiper apparatus provided in a vehicle generally includes a lever member coupled to a wiper arm, and a blade rubber retained by the lever member. Japanese Laid-Open Patent Publication No. 2008-132884 discloses a wiper blade, which includes first and second retaining hooks projecting toward a surface to be wiped and arranged at an interval along the longitudinal direction of the wiper blade so as to reduce the weight and the amount of material of the lever member. The blade rubber includes accommodating grooves opening sideways along the blade rubber (that is, in the wiping direction). The retaining hooks retain leaf spring members mounted in the accommodating grooves, and prevent the leaf spring members from falling out of the accommodating grooves.

In cold climate areas, the blade rubber might stick to the surface to be wiped for freezing. In this case, for example, when the wiper motor is activated so that the wiper blade starts moving from a wiper stop position, the blade rubber is pulled by force acting in the opposite direction to the starting direction (movement direction), between the surface to be wiped and the wiper blade at part of the lever member between the first and second retaining hooks.

In this case, since the accommodating groove and the leaf spring member are exposed, if the interval between the retaining hooks is great in particular, the leaf spring member might fall out of the accommodating groove when the blade rubber greatly deforms between the retaining hooks (more specifically, when the blade rubber deforms in such a manner as to be twisted while being delayed from following the movement of the retaining hooks).

SUMMARY OF THE INVENTION

Accordingly, it is an objective of the present invention to provide a wiper blade that prevents a mounted leaf springs member from falling off a blade rubber in a suitable manner.

To achieve the above objective, one aspect of the present invention provides a wiper blade, which is connectable to a wiper arm for wiping a surface to be wiped while swinging to-and-fro between a wiper stop position and a reversal position. The wiper blade includes a lever member configured to be coupled to the wiper arm, and a blade rubber retained by the lever member. The lever member includes first and second retaining hooks projecting toward the surface to be wiped and arranged at an interval along the longitudinal direction of the lever member. The blade rubber includes an accommodating groove, which is open toward a wiping direction. A leaf spring member is mounted in the accommodating groove. The first and second retaining hooks retain the blade rubber while preventing the leaf spring member from falling out of the accommodating groove. The lever member further includes a fall-off preventing protrusion arranged between the first and second retaining hooks in the longitudinal direction of the lever member. The fall-off preventing protrusion projects toward the surface to be wiped. The fall-off preventing protrusion is arranged on the rear side of the blade rubber with respect to a direction in which the blade rubber moves from the wiper stop position toward the reversal position. The fall-off preventing protrusion permits movement of the blade rubber in the direction perpendicular to the surface to be wiped. When the blade rubber moves from the wiper stop position toward the reversal position, the fall-off preventing protrusion receives the blade rubber so as to prevent the leaf spring member from falling out of the accommodating groove.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a perspective view illustrating a vehicle wiper according to one embodiment of the present invention;

FIG. 2A is a front view illustrating a state where the wiper blade of the vehicle wiper of FIG. 1 is located along a flat surface;

FIG. 2B is a front view illustrating a state where the blade rubber of the vehicle wiper of FIG. 1 is located along a flat surface;

FIG. 2C is a cross-sectional view taken along line 2C-2C in FIG. 2A;

FIG. 2D is a cross-sectional view taken along line 2D-2D in FIG. 2A;

FIG. 3A is a front view illustrating a state where the wiper blade of the vehicle wiper of FIG. 1 is located along a curved surface; and FIG. 3B is a cross-sectional view taken along line 3B-3B in FIG. 3A.

DETAILED DESCRIPTION OF THE PREFERRED EMBODIMENTS

One embodiment of the present invention will now be described with reference to FIGS. 1 to 3B.

FIG. 1 shows a vehicle wiper 11, which wipes off, for example, rain drops on a surface to be wiped 1a of an automobile windshield (windshield glass) 1. The vehicle wiper 11 includes a wiper arm 12 and a wiper blade 13. The proximal end portion of the wiper arm 12 is secured to a pivot shaft (not shown), which is rotated by driving force of a wiper motor (not shown), and the direction of rotation alternates at a predetermined angle. The wiper arm 12 swings to-and-fro in accordance with the rotation of the pivot shaft. The wiper blade 13 is rotatably coupled to the distal end portion of the wiper arm 12 via a coupling clip 14. A spring (not shown), which applies pressure to press the wiper blade 13 against the surface to be wiped 1a, is mounted on the wiper arm 12. The wiper blade 13, together with the wiper arm 12, moves from a wiper stop position (home position) to a reversal position, and reverses the moving direction at the reversal position to move toward the wiper stop position. The wiper stop position is the position along the lower end of the windshield 1 (the surface to be wiped 1a).

The wiper blade 13 includes a wiper lever 21 and a blade rubber 22 as shown in FIGS. 2A to 3B. FIGS. 2A and 2B are front views showing a state where the wiper blade 13 is located along a flat surface, more specifically, a state where the edge (lower edge) of the blade rubber 22 closer to the surface to be wiped 1a abuts against the surface to be wiped 1a. FIGS. 3A and 3B are front views showing a state where the wiper blade 13 is located along a curved surface, more specifically, a state where the lower edge of the blade rubber 22 abuts against the curved surface to be wiped 1a.

The wiper lever 21 includes a lever member, which is a main lever 31 in this embodiment, and two movable members 32. A longitudinally middle portion of the main lever 31 is rotatably coupled to the distal end portion of the wiper arm 12 via the coupling clip 14. The proximal end portion of each of the movable members 32 in the longitudinal direction is rotatably (about an axis X in FIG. 2A) coupled to one of the longitudinal ends of the main lever 31.

More specifically, the main lever 31 is formed of resin material, and has a substantially U-shaped cross-section in the direction perpendicular to the longitudinal direction so that the main lever 31 is open toward the surface to be wiped 1a along its entire length. An upper opening portion 31a (see FIG. 1), which extends through the main lever 31 in the up-and-down direction (the direction perpendicular to the surface to be wiped 1a), is formed at the upper section of the longitudinally middle portion of the main lever 31 (the portion further from the surface to be wiped 1a). A coupling shaft 31d (see FIG. 2A) is arranged between a pair of side walls 31b, 31c (see FIGS. 2C and 2D) of the main lever 31 at the position corresponding to the upper opening portion 31a. The coupling shaft 31d couples the side walls 31b, 31c. The coupling shaft 31d is coupled to the distal end portion of the wiper arm 12 via the coupling clip 14 (see FIG. 1).

The movable members 32 are also formed of resin material, and have a substantially U-shaped cross-section in the direction perpendicular to the longitudinal direction so that the movable members 32 are open toward the surface to be wiped 1a along the entire length of the movable members 32. The proximal end portion of each of the movable members 32 in the longitudinal direction is coupled to the inner section of one of the longitudinal ends of the main lever 31 to be rotatable about the corresponding axis X (see FIG. 2A). That is, the movable members 32 are provided such that they appear to be continuous (have minimum steps in the longitudinal direction) with the main lever 31. A fin surface 21a (see FIGS. 2C and 2D) is formed substantially along the entire length of the side wall facing forward of the vehicle (in a state where the wiper lever 21 is mounted on the vehicle) on the outer surface of the wiper lever 21 (the main lever 31 and the movable members 32) of the present embodiment. The fin surface 21a generates force that presses the blade rubber 22 against the surface to be wiped 1a when a relative wind flows past during travel of the vehicle.

A pair of retaining hooks 31e, which retains the blade rubber 22, is formed on each longitudinal end of the main lever 31 to project toward the surface to be wiped 1a. The pair of retaining hooks 31e provided on one of the longitudinal ends of the main lever 31 is referred to as first retaining hooks, and the pair of retaining hooks 31e provided on the other longitudinal end of the main lever 31 is referred to as second retaining hooks. Each pair of retaining hooks 31e is located closer to the center of the main lever 31 than the longitudinally endmost portion of the main lever 31. The interval between the first retaining hooks 31e and the second retaining hooks 31e is greater than the length of the upper opening portion 31a and smaller than the length of the blade rubber 22 (see FIG. 1) in the longitudinal direction of the main lever 31. In other words, the first and second retaining hooks 31e are provided on both sides of the upper opening portion 31a in the longitudinal direction of the main lever 31. Also, each pair of retaining hooks 31e extends downward from the lower edge of the pair of side walls 31b, 31c of the main lever 31 (shown by a broken line), and are bent such that the distal ends of the retaining hooks 31e approach each other as shown in FIG. 2C.

Thus, the pair of retaining hooks 31e holds an upper section 22a of the blade rubber 22. A bridge 31f, which connects the side walls 31b and 31c, is formed on the main lever 31 where each pair of retaining hooks 31e is formed as shown in FIG. 2C. The bridge 31f contacts the upper section 22a of the blade rubber 22 (more specifically, the upper surface of the upper section 22a). The bridge 31f functions to prevent the blade rubber 22 from moving in the direction away from the surface to be wiped 1a, and ensure the rigidity of the retaining hooks 31e.

Similar to the retaining hooks 31e, a pair of (only one is shown) distal end retaining hooks 32a for holding the blade rubber 22 (the upper section 22a) is provided on the distal end portion of each movable member 32 in the longitudinal direction to project toward the surface to be wiped 1a as shown in FIG. 2A.

The blade rubber 22 is formed of rubber material into an elongated shape, and includes the upper section 22a, which is retained (grasped) by the retaining hooks 31e and the distal end retaining hooks 32a, and a wiping section 22b, which extends downward (in the direction toward the surface to be wiped 1a) from the upper section 22a. The wiping section 22b is selectively tilted with respect to the upper section 22a. A pair of accommodating grooves 22c, which open toward the wiping direction, that is, sideways (left-and-right direction in FIG. 2C) of the blade rubber 22, is formed in the upper section 22a to extend along the longitudinal direction. A leaf spring member, which is a planar backing 33 formed of a metal plate in this embodiment, is mounted on each of the accommodating grooves 22c such that the planar surface of the backing 33 is parallel to the wiping direction. The backing 33 functions to distribute the pressure applied to the surface to be wiped 1a from the wiper arm 12 to the entire length of the blade rubber 22. Thus, the wiping section 22b is pressed against the surface to be wiped 1a along its entire length. That is, besides the portion between the first and second retaining hooks 31e, trailing end portions 22d (see FIG. 2A) of the blade rubber 22 extending in the longitudinal direction beyond the retaining hooks 31e are also pressed against the surface to be wiped 1a. The retaining hooks 31e and the distal end retaining hooks 32a grasp the upper section 22a including the backings 33 (and the accommodating grooves 22c), and function to prevent the backings 33 from falling out of the accommodating grooves 22c at the grasped portion.

Also, a deformation inhibiting portion, which is a thick portion 22e in this embodiment, is formed on the blade rubber 22 of the present embodiment between the first and second retaining hooks 31e as shown in FIGS. 2B and 2D. The thick portion 22e inhibits deformation of the accommodating grooves 22c (more specifically, the wall portion above the accommodating grooves 22c). As shown in FIG. 2D, the wall portion above the accommodating grooves 22c bulges upward so as to form the thick portion 22e. That is, the thickness of the thick portion 22e is greater than that of the portion retained by the retaining hooks 31e as shown in FIG. 2C. More specifically, the thick portion 22e has a thickness in the direction perpendicular to the surface to be wiped 1a. The thickness gradually increases toward the center from both sides of the blade rubber 22 in the wiping direction (left-and-right direction in FIG. 2D), that is, in the widthwise direction of the blade rubber 22.

As shown in FIGS. 2A and 2D, fall-off preventing protrusions 31g (two in this embodiment) are provided on the main lever 31 between the first and second retaining hooks 31e. The fall-off preventing protrusions 31g extend toward the surface to be wiped 1a from the side wall 31b including the fin surface 21a, and are arranged on the rear side of the blade rubber 22 with respect to the direction in which the blade rubber 22 is moved from the wiper stop position toward the reversal position (starting direction). The fall-off preventing protrusions 31g permit the movement (up-and-down movement) of the blade rubber 22 in the direction perpendicular to the surface to be wiped 1a with a space K between the upper section 22a of the blade rubber 22 and the inner surface of the main lever 31. The fall-off preventing protrusions 31g also receive force applied to the blade rubber 22 (the force acting in the direction opposite to the starting direction) when the blade rubber 22 starts moving from the wiper stop position toward the reversal position, and prevent the backings 33 from falling out of the accommodating grooves 22c.

In the present embodiment, the fall-off preventing protrusions 31g are located at the position displaced from the center position between the first and second retaining hooks 31e in the longitudinal direction of the wiper blade 13, and on both sides of the center position as shown in FIG. 2A. More specifically, two fall-off preventing protrusions 31g are provided at two positions located at equal distances from the center position. The fall-off preventing protrusions 31g are formed such that, in a state where the blade rubber 22 lies along the curved surface (the curved surface to be wiped 1a), at least the fall-off preventing protrusions 31g or the side wall 31b face the corresponding backing 33 (and the associated accommodating groove 22c) in the wiping direction as shown in FIGS. 3A and 3B. In the present embodiment, the fall-off preventing protrusions 31g extend from the side wall 31b to the position substantially facing the lower end of the upper section 22a. The fall-off preventing protrusions 31g are also formed to face at least the corresponding backing 33 (and the associated accommodating groove 22c) in the wiping direction in a state where the blade rubber 22 lies along the flat surface as shown in FIGS. 2A and 2D. In the present embodiment, the fall-off preventing protrusions 31g extend to the position slightly lower than the corresponding backing 33 (and the associated accommodating groove 22c). As shown in FIG. 2D, a space S is provided between the fall-off preventing protrusions 31g and the blade rubber 22 in a state where no force is applied to the blade rubber 22 (force in the direction opposite to the starting direction). When great force is applied to the blade rubber 22 in the direction opposite to the starting direction, slight deformation of the blade rubber 22 causes the fall-off preventing protrusions 31g to abut against the blade rubber 22 and the associated backing 33. Thus, the backings 33 are prevented from falling out of the accommodating grooves 22c. More specifically, in the wiping direction (in the widthwise direction of the blade rubber 22), the width of the space S between the fall-off preventing protrusions 31g and the blade rubber 22 is smaller than the width of part of the backing 33 accommodated in the accommodating groove 22c. Also, the width of the fall-off preventing protrusions 31g is smaller than the width of the retaining hooks 31e in the longitudinal direction of the main lever 31 (left-and-right direction in FIG. 2A) as shown in FIG. 2A.

As shown in FIG. 2D, a space F is provided between the side wall 31b of the main lever 31 and the front side portion of the blade rubber 22 facing the side wall 31b, and a space R is provided between the other side wall 31c of the main lever 31 and the rear side portion of the blade rubber 22 facing the side wall 31c. The spaces F, R are provided at least between the first and second retaining hooks 31e in the longitudinal direction of the wiper blade 13. The width of the space F between the side wall 31b and the front side portion of the blade rubber 22 is smaller than the width of the space R between the side wall 31c and the rear side portion of the blade rubber 22.

The present embodiment has the following advantages, (1) For example, in a case where the blade rubber 22 sticks to the surface to be wiped 1a for freezing, force is applied to the blade rubber 22 in the direction opposite to the starting direction (the direction in which the blade rubber 22 is moved) when the wiper blade 13 starts moving from the wiper stop position by activation of the wiper motor. However, even if such great force is applied to the blade rubber 22, the fall-off preventing protrusions 31g prevent the backings 33 from falling out of the accommodating grooves 22c. Also, since the fall-off preventing protrusions 31g permit the blade rubber 22 to move (up-and-down movement) in the direction perpendicular to the surface to be wiped 1a with the space K, the blade rubber 22 reliably trails along the surface to be wiped 1a. Also, since the width of the retaining hooks 31e and the fall-off preventing protrusions 31g in the longitudinal direction of the main lever 31 is relatively small, the weight and the amount of material of the main lever 31 are reduced as compared to, for example, the case in which a continuous wall portion is formed at the portion corresponding to the retaining hooks 31e and the fall-off preventing protrusions 31g extending along the longitudinal direction.

(2) Since the fall-off preventing protrusions 31g are located at the position displaced from the center position between the first and second retaining hooks 31e n the longitudinal direction of the main lever 31, the projecting amount of the fall-off preventing protrusions 31g is reduced. That is, the movement amount of the blade rubber 22 in the direction perpendicular to the surface to be wiped 1a is the maximum at the center position. Thus, if fall-off preventing protrusions are provided at the center position, the projecting amount of the fall-off preventing protrusions needs to be increased to prevent the backings 33 from falling out of the accommodating grooves 22c. However, the present embodiment avoids such a problem. Thus, the weight and the amount of material of the main lever 31 are reduced.

(3) Since the fall-off preventing protrusions 31g (two in this embodiment) are provided on both sides of the center position between the first and second retaining hooks 31e in the longitudinal direction of the main lever 31, the backings 33 are prevented from falling out of the accommodating grooves 22c in a suitable manner. In particular, two fall-off preventing protrusions 31g are provided at two positions located at equal distances from the center position in the present embodiment. Thus, the fall-off preventing protrusions 31g are arranged in a well-balanced manner, preventing the backings 33 from falling out of the accommodating grooves 22c in a further suitable manner.

(4) The blade rubber 22 includes the deformation inhibiting portion (the thick portion 22e) located between the first and second retaining hooks 31e. The deformation inhibiting portion inhibits deformation of the accommodating grooves 22c. Thus, deformation that pulls the longitudinally center portion of the blade rubber 22 and enlarges the openings of the accommodating grooves 22c when the wiper blade 13 is lifted so as to be taken off from the surface to be wiped 1a is inhibited, and the backings 33 are further prevented from falling out of the accommodating grooves 22c.

(5) The deformation inhibiting portion includes the thick portion 22e formed by increasing the thickness of the wall portion above the accommodating grooves 22c of the blade rubber 22. Thus, the deformation inhibiting portion is easily provided as compared to the case, for example, where a separate member is mounted later as the deformation inhibiting portion.

(6) In a state where no force (force acting in the direction opposite to the starting direction) is applied to the blade rubber 22, the space S is provided between the fall-off preventing protrusions 31g and the blade rubber 22. Thus, the movement of the blade rubber 22 (up-and-down movement) in the direction perpendicular to the surface to be wiped 1a is less hindered. That is, if the fall-off preventing protrusions 31g constantly abut against the blade rubber 22, the frictional force generated at the abutment portion might become resisting force that hinders the up-and-down movement of the blade rubber 22. However, the up-and-down movement of the blade rubber 22 is less hindered in the present embodiment, and the blade rubber 22 more reliably follows the surface to be wiped 1a. In particular, in the present embodiment, the width of the space S between the fall-off preventing protrusions 31g and the blade rubber 22 in the wiping direction is smaller than the width of the part of the backing 33 accommodated in the accommodating groove 22c. Thus, the fall-off preventing protrusions 31g more reliably prevent the backings 33 from failing out of the accommodating grooves 22c.

(7) In the present embodiment, the fall-off preventing protrusions 31g is formed by projecting a small portion of the side wall 31b and the projecting amount of the fall-off preventing protrusions 31g is reduced. Thus, in the most part along the longitudinal direction of the side wall 31b, the space F is provided between the side wall 31b of the main lever 31 and the front side portion of the blade rubber 22. The space R is provided between the side wall 31c of the main lever 31 and the rear side portion of the blade rubber 22. That is, the spaces F and R, which permit the flow of air, are provided between the first and second retaining hooks 31e located at the longitudinal ends of the main lever 31, and between the lower ends of the side walls 31b and 31c of the main lever 31 and the upper section 22a of the blade rubber 22. In particular, in the present embodiment, the thickness of the thick portion 22e of the upper section 22a is gradually increased toward the center from both sides of the blade rubber 22 in the widthwise direction of the blade rubber 22. That is, since the thickness of the thick portion 22e is relatively small at the widthwise ends of the blade rubber 22, the size of the spaces F and R is maximized. Thus, air smoothly flows between the main lever 31 and the blade rubber 22 during operation of the wiper blade 13. If the flow of air is hindered between the main lever 31 and the blade rubber 22, a pressure difference is generated between upstream and downstream parts of the air flow passing through the moving wiper blade 13 (in particular, the longitudinally center portion where the main lever 31 is located). In particular, a negative pressure is generated at the downstream section. In this case, when the wiper blade 13 is reversed at the reversal position (in particular, an upper reversal position), collected rain drops are dragged with the wiper blade 13 due to the operation of the negative pressure, and are adhered to the wiped surface again. However, according to the present embodiment, in which the flow of air between the main lever 31 and the blade rubber 22 is smoothed, generation of such a negative pressure is minimized, and the collected rain drops are inhibited from adhering to the wiped surface. For example, when the wiper blade 13 is reversed at the reversal position, air that flows in from the space F passes through the space K and flows out from the space R smoothly. Thus, the negative pressure generated at the wiper blade 13 is reliably reduced.

(8) The width of the fall-off preventing protrusions 31g along the longitudinal direction of the wiper blade 13 is smaller than the width of the retaining hooks 31e along the longitudinal direction. Thus, an unnecessary enlargement of the main lever 31 is avoided, reducing the weight and the amount of material of the main lever 31. Also, the fall-off preventing protrusions 31g are kept as unobtrusive as possible, inhibiting deterioration of the appearance.

The above described embodiment may he modified as follows.

In the above described embodiment, the fall-off preventing protrusions 31g are located at the position displaced from the center position between the first and second retaining hooks 31e, However, the fall-off preventing protrusions 31g may be located at the center position.

In the above described embodiment, the fall-off preventing protrusions 31g (two fall-off preventing protrusions 31g) are provided on both sides of the center position between the first and second retaining hooks 31e. However, only a single fall-off preventing protrusion 31g may be located at the position displaced from the center position. The number of the fall-off preventing protrusions 31g may be changed to three or more. Also, in the above described embodiment, two fall-off preventing protrusions 31g are provided on both sides of the center position at two positions located at equal distances from the center position. However, two fall-off preventing protrusions 31g may be provided at two positions located at different distances from the center position.

In the above described embodiment, the blade rubber 22 includes the deformation inhibiting portion (the thick portion 22e) for inhibiting deformation of the accommodating grooves 22c between the first and second retaining hooks 31e. However, the deformation inhibiting portion may be located along the entire length of the blade rubber 22 including the portion between the first and second retaining hooks 31e. Alternatively, the deformation inhibiting portion may be provided partially between the first and second retaining hooks 31e of the blade rubber 22. Also, the deformation inhibiting portion does not need to be provided. Furthermore, as long as deformation of the accommodating grooves 22c is inhibited, part of the deformation inhibiting portion corresponding to the thick portion 22e may be formed as a separate member, and attached to the blade rubber 22 with, for example, an adhesive.

In the above described embodiment, in a state where no force (force acting in the direction opposite to the starting direction) is applied to the blade rubber 22, the space S is provided between the fall-off preventing protrusions 31g and the blade rubber 22. However, the fall-off preventing protrusions 31g may be provided to slidably abut against the blade rubber 22 in a state where no force is applied to the blade rubber 22.

In the above described embodiment, the width of the fall-off preventing protrusions 31g along the longitudinal direction of the wiper blade 13 is smaller than the width of the retaining hooks 31e along the longitudinal direction. However, for example, the width of the fall-off preventing protrusions 31g and the width of the retaining hooks 31e may be the same, and the width of the fall-off preventing protrusions 31g may be greater than the width of the retaining hooks 31e. When the width of the fall-off preventing protrusions 31g and the width of the retaining hooks 31e are the same, the uniform widths improves aesthetic appearance.

In the above described embodiment, the wiper lever 21 includes the main lever 31 and two movable members 32. However, for example, the wiper lever 21 may include no movable members 32 and may include only a lever member corresponding to the main lever 31. In this case, the upper surfaces of parts of the blade rubber 22 extending from the longitudinal ends of the lever member are exposed.

In the above described embodiment, the fall-off preventing protrusions 31g are integrally formed with the main lever 31. However, the fall-off preventing protrusions 31g may be formed as separate members, and may be provided on the main lever 31 by, for example, an adhesion or insert molding.

In the above described embodiment, the main lever 31 is formed of resin material. However, for example, the main lever 31 may be formed of metal material, or part of the main lever 31 may be formed of metal.

What is claimed is:

1. A wiper blade for connection to a wiper arm for wiping a surface to be wiped while swinging to-and-fro between a wiper stop position and a reversal position, the wiper blade comprising:
   a single lever member configured to be coupled to the wiper arm, the lever member including first and second retaining hooks arranged at an interval along the longitudinal direction of the lever member; and
   a blade rubber retained by the lever member, the blade rubber including an accommodating groove open toward a wiping direction, a leaf spring member mounted in the accommodating groove, in which the first retaining hook retains the blade rubber at a first position and the second retaining hook retains the blade rubber at a second position that is different than the first position while preventing the leaf spring member from falling out of the accommodating groove,
   wherein the lever member includes a plurality of fall-off preventing protrusions each arranged between the first and second retaining hooks in the longitudinal direction of the lever member and located on both sides of a center position between the first and second retaining hooks in the longitudinal direction of the lever member, the fall-off preventing protrusions projecting toward the surface to be wiped and being arranged on a rear side of the blade rubber with respect to a direction in which the blade rubber moves from the wiper stop position toward the reversal position, the fall-off preventing protrusion permitting movement of the blade rubber in the direction perpendicular to the surface to be wiped, and, when the blade rubber moves from the wiper stop position toward the reversal position, the fall-off preventing protrusion receives the blade rubber so as to prevent the leaf spring member from falling out of the accommodating groove.

2. The wiper blade according to claim 1, wherein the blade rubber includes a deformation inhibiting portion for inhibiting deformation of the accommodating groove, the deformation inhibiting portion being arranged between the first and second retaining hooks.

3. The wiper blade according to claim 2, wherein the deformation inhibiting portion includes a thick portion, which is formed by increasing the thickness of a wall portion above the accommodating groove.

4. The wiper blade according to claim 1, wherein the wiper blade further comprises first and second trailing end portions each extending in the longitudinal direction beyond the corresponding retaining hook.

5. A wiper blade for connection to a wiper arm for wiping a surface to be wiped while swinging to-and-fro between a wiper stop position and a reversal position the wiper blade comprising:
   a lever member configured to be coupled to the wiper arm, the lever member including first and second retaining hooks projecting toward the surface to be wiped and arranged at an interval on the longitudinal direction of the lever member; and
   a blade rubber retained by the lever member, the blade rubber including an accommodating groove open toward a wiping direction, a leaf spring member mounted in the accommodating groove, in which the first and second retaining hooks retain the blade rubber while preventing the leaf spring member from falling out of the accommodating groove,
   wherein the lever member includes a fall-off preventing protrusion arranged between the first and second retaining hooks in the longitudinal direction of the lever member, the fall-off preventing protrusion projecting toward the surface to be wiped and being arranged on a rear side of the blade rubber with respect to a direction in which the blade rubber moves from the wiper stop position toward the reversal position, the fall-off preventing protrusion permitting movement of the blade rubber in the direction perpendicular to the surface to be wiped, and, when the blade rubber moves from the wiper stop position toward the reversal position, the fall-off preventing protrusion receives the blade rubber so as to prevent the leaf spring member from falling out of the accommodating groove wherein the blade rubber includes a deformation inhibiting portion for inhibiting deformation of the accommodating groove, the deformation inhibiting portion being arranged between the first and second retaining hooks, the deformation inhibiting portion including a thick portion, which is formed by increasing the thickness of a wall portion above the accommodating groove, wherein the thick portion has a thickness in the direction perpendicular to the surface to be wiped, and the thickness gradually increases from both sides of the blade rubber toward the center in the wiping direction.

6. The wiper blade according to claim 5, wherein the fall-off preventing protrusion is located at a position displaced from a center position between the first and second retaining hooks in the longitudinal direction of the lever member.

7. The wiper blade according to claim 6, wherein, in a state where no force is applied to the blade rubber, the fall-off preventing protrusion is arranged such that a space is provided between the fall-off preventing protrusion and the blade rubber.

8. The wiper blade according to claim 7, wherein the width of the space in the wiping direction is smaller than the width of the leaf spring member.

9. The wiper blade according to claim 5, wherein the lever member includes a pair of side walls on both sides of the lever member in the direction perpendicular to the longitudinal direction of the lever member, and, between at least the first and second retaining hooks in the longitudinal direction, a space is provided between the blade rubber and each of the pair of side walls.

10. The wiper blade according to claim 5, wherein the width of the fall-off preventing protrusion is smaller than the width of the retaining hooks in the longitudinal direction of the lever member.

11. The wiper blade according to claim 5, wherein, in a state where no force is applied to the blade rubber, the fall-off preventing protrusion is arranged such that a space is provided between the fall-off preventing protrusion and the blade rubber.

12. The wiper blade according to claim 11, wherein the width of the space in the wiping direction is smaller than the width of the leaf spring member.

13. The wiper blade according to claim 5, wherein the fall-off preventing protrusion is one of a plurality of fall-off preventing protrusions located on both sides of a center position between the first and second retaining hooks in the longitudinal direction of the lever member.

14. The wiper blade according to claim 5, wherein the wiper blade further comprises first and second trailing end portions each extending in the longitudinal direction beyond the corresponding retaining hook.

\* \* \* \* \*